(12) United States Patent
Jung (10) Patent No.: US 11,383,681 B2
(45) Date of Patent: Jul. 12, 2022

(54) DRUM BRAKE APPARATUS FOR VEHICLE

(71) Applicant: HYUNDAI MOBIS CO., LTD., Seoul (KR)

(72) Inventor: Min Kyu Jung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/727,166

(22) Filed: Dec. 26, 2019

(65) Prior Publication Data

US 2020/0216042 A1 Jul. 9, 2020

(30) Foreign Application Priority Data

Jan. 3, 2019 (KR) .................. 10-2019-0000598

(51) Int. Cl.
| | |
|---|---|
| *F16D 65/16* | (2006.01) |
| *B60T 1/06* | (2006.01) |
| *B60T 13/02* | (2006.01) |
| *F16D 51/22* | (2006.01) |
| *F16D 125/40* | (2012.01) |

(52) U.S. Cl.
CPC .............. *B60T 1/067* (2013.01); *B60T 13/02* (2013.01); *F16D 51/22* (2013.01); *F16D 2125/40* (2013.01)

(58) Field of Classification Search
CPC ........ B60T 1/067; B60T 13/02; B60T 13/741; F16D 2121/24; F16D 2125/20; F16D 2125/22; F16D 2125/40; F16D 2125/46; F16D 2125/52; F16D 51/20; F16D 51/22; F16D 65/08; F16D 65/09; F16D 65/091; F16D 65/22; F16D 65/56; F16D 65/561; F16D 65/563

See application file for complete search history.

(56) References Cited

U.S. PATENT DOCUMENTS

| | | | | |
|---|---|---|---|---|
| 2,202,661 | A | * | 5/1940 | Payton et al. .......... F16D 51/26 188/325 |
| 3,227,247 | A | * | 1/1966 | Sherretts ................. F16D 65/22 188/79.57 |
| 3,249,182 | A | * | 5/1966 | O'Reilly ................. F16D 65/22 188/78 |

(Continued)

FOREIGN PATENT DOCUMENTS

| | | |
|---|---|---|
| JP | 59-56439 U | 4/1984 |
| KR | 20-1999-0041547 A | 12/1999 |

(Continued)

OTHER PUBLICATIONS

Office Action dated Sep. 3, 2021 in corresponding Chinese Patent Application No. 201911365411.X (no English Language Translation).

*Primary Examiner* — Robert A. Siconolfi
*Assistant Examiner* — Stephen M Bowes
(74) *Attorney, Agent, or Firm* — NovoTechIP International PLLC (57) ABSTRACT

A drum brake apparatus for a vehicle may include: a cylinder device configured to apply a braking force to a shoe; a clip part extended from the cylinder device toward the shoe, and elastically contacting the shoe; a cylinder coupling part coupling the clip part to the cylinder device; and a shoe assembling part fastening the clip part to the shoe.

9 Claims, 6 Drawing Sheets

(56) References Cited

U.S. PATENT DOCUMENTS

| | | | | |
|---|---|---|---|---|
| 3,351,161 | A | * | 11/1967 | Lepelletier ............... F16D 51/24 188/346 |
| 3,570,632 | A | * | 3/1971 | Williams ............... F16D 65/562 188/79.57 |
| 4,603,762 | A | * | 8/1986 | Kajihara ................ F16D 65/561 188/196 BA |
| 4,986,394 | A | * | 1/1991 | Taft ......................... F16D 65/22 188/217 |
| 5,913,390 | A | * | 6/1999 | Hostetler ................. F16D 65/22 188/79.51 |
| 6,684,988 | B2 | * | 2/2004 | Kapaan .................... F16D 51/20 188/162 |
| 2003/0038002 | A1 | | 2/2003 | Kapaan |

FOREIGN PATENT DOCUMENTS

| KR | 10-2002-0073343 A | | 9/2002 |
|---|---|---|---|
| KR | 10-2013-0070746 A | | 6/2013 |
| KR | 10-2018-0064839 A | | 6/2018 |
| KR | 20180064839 A | * | 6/2018 |

* cited by examiner

DRUM BRAKE APPARATUS FOR VEHICLE

CROSS-REFERENCES TO RELATED APPLICATIONS

The present application claims priority to Korean application number 10-2019-0000598, filed on Jan. 3, 2019, which is incorporated by reference in its entirety.

BACKGROUND OF THE INVENTION

The present invention relates to a drum brake apparatus for a vehicle, and more particularly, to a drum brake apparatus for a vehicle, which can move shoes in connection with an operation of a cylinder device.

In general, a drum brake of a vehicle includes a drum rotated with a wheel, a pair of shoes disposed on a back plate so as to face the inner circumferential surface of the drum and having a friction material attached to the outer circumference thereof, and a wheel cylinder for transferring a braking force to the shoes. When the drum brake is operated, the pair of shoes are pushed by the wheel cylinder and expanded and moved in a direction away from each other. Then, when the wheel cylinder is returned to the initial position, the pair of shoes are returned to the initial position by a restoring force of a return spring.

The related art of the present invention is disclosed in Korean Patent Publication No. 2013-0070746 published on Jun. 28, 2013 and entitled "Drum brake for vehicle".

The conventional drum brake for a vehicle implements the operation of returning the pair of shoes to the initial position using the return spring installed between the shoes. Thus, vehicle parts are applied and developed on the assumption that the vehicle parts have sizes, shapes and arrangement capable of avoiding the interference with the return spring. In this case, there is a limitation in improving the performance of the vehicle.

Therefore, there is a demand for a structure capable of solving the problem.

SUMMARY OF THE INVENTION

Embodiments of the present invention are directed to a drum brake apparatus for a vehicle, which can omit a return spring because shoes are returned in connection with a returning operation of a cylinder device, and thus improve a degree of freedom in design.

In one embodiment, a drum brake apparatus for a vehicle may include: a cylinder device configured to apply a braking force to a shoe; a clip part extended from the cylinder device toward the shoe, and elastically contacting the shoe; a cylinder coupling part coupling the clip part to the cylinder device; and a shoe assembling part fastening the clip part to the shoe.

When an actuator is driven in a forward direction, the cylinder device may press the shoe to brake a vehicle while the length of the cylinder device is increased. When the actuator is driven in a reverse direction, the clip part and the shoe may be moved to initial positions in connection with a returning operation of the cylinder device, such that the braking of the vehicle is released.

The cylinder device may include: a rotating rod installed so as to rotate at a correct position and having bolt screws formed at both ends thereof; a piston part having nut screws engaged with the bolt screws so as to be coupled to both ends of the rotating rod, and moved in an extension direction of the rotating rod when the rotating rod is rotated; a rotation constraint part formed at an end of the piston part so as to extend toward the shoe, and constraining rotation of the piston part using a contact force with the shoe; and a clip coupling part formed on the rotation constraint part, such that the clip part is coupled to the clip coupling part.

The clip coupling part may include: a clip seating part formed evenly on the rotation constraint part, wherein the clip part is brought in surface contact with the clip seating part and the cylinder coupling part is coupled to the clip seating part; and an anti-movement protrusion formed at one side of the clip seating part, and contacting the clip part so as to restrain movement of the clip part.

The clip part may include: a first clip contacting the shoe; and a second clip disposed opposite to the first clip, and elastically contacting the shoe in either direction with the first clip.

The first clip may include: a piston coupling part coupled to the cylinder device by the cylinder coupling part; and a shoe spring part connected to the piston coupling part, and elastically contacting the shoe.

The piston coupling part may include: a piston fixing part extended in a direction parallel to the extension direction of the cylinder device, brought in surface contact with the cylinder device, and fixed to the cylinder device by the cylinder coupling part; and an anti-movement bent part formed continuously with the piston fixing part, extended in a different direction from the piston fixing part along an end of the cylinder device, and constrained from moving by a contact force with the cylinder device.

The cylinder coupling part may include: a fastening hole formed at an end of the cylinder device; and a fastening member fastened to the fastening hole through the clip part.

The shoe assembling part may include: an anti-interference part formed in a long hole shape through the clip part; and a guide pin coupled to the shoe so as to protrude from the shoe, and fitted into the anti-interference part.

The anti-interference part may be formed in a circular arc shape having a first radius corresponding to a distance between the guide pin and an origin positioned on the center axis of the cylinder device.

The guide pin may have a protrusion height enough to move into or out of the anti-interference part when an end of the clip part is elastically deformed away from the shoe.

The cylinder device may include a round guide part which is formed in a rounded shape having a second radius based on an origin positioned on the center axis of the cylinder device, and faces the shoe. The shoe may include a round contact part which is formed in a concavely rounded shape with the second radius, faces the round guide part, and is slid along the round guide part when the shoe is moved.

In the drum brake for a vehicle in accordance with the embodiment of the present invention, the cylinder device and the shoe may be connected through the first and second clips. Thus, the shoe may be moved in connection with the expansion of the cylinder device, and returned to the initial position in connection with the return of the cylinder device.

Therefore, it is possible to omit not only a return spring which has been installed to return the shoe to the initial position in the related art, but also a inconvenient process of disposing a return spring in consideration of interference with neighboring parts and fastening both ends of the return spring to the pair of shoes. Thus, the simplification of the assembly process can improve the assembling property.

Furthermore, a return spring can be omitted from the limited space formed between the pair of shoes, which makes it possible to significantly improve the degree of freedom in design of the vehicle. Therefore, vehicle parts such as a tone wheel, which could not be applied in order to avoid interference with a return spring, can be applied and upgraded, thereby expanding the performance of the vehicle.

DESCRIPTION OF SPECIFIC EMBODIMENTS

Hereafter, a drum brake apparatus for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
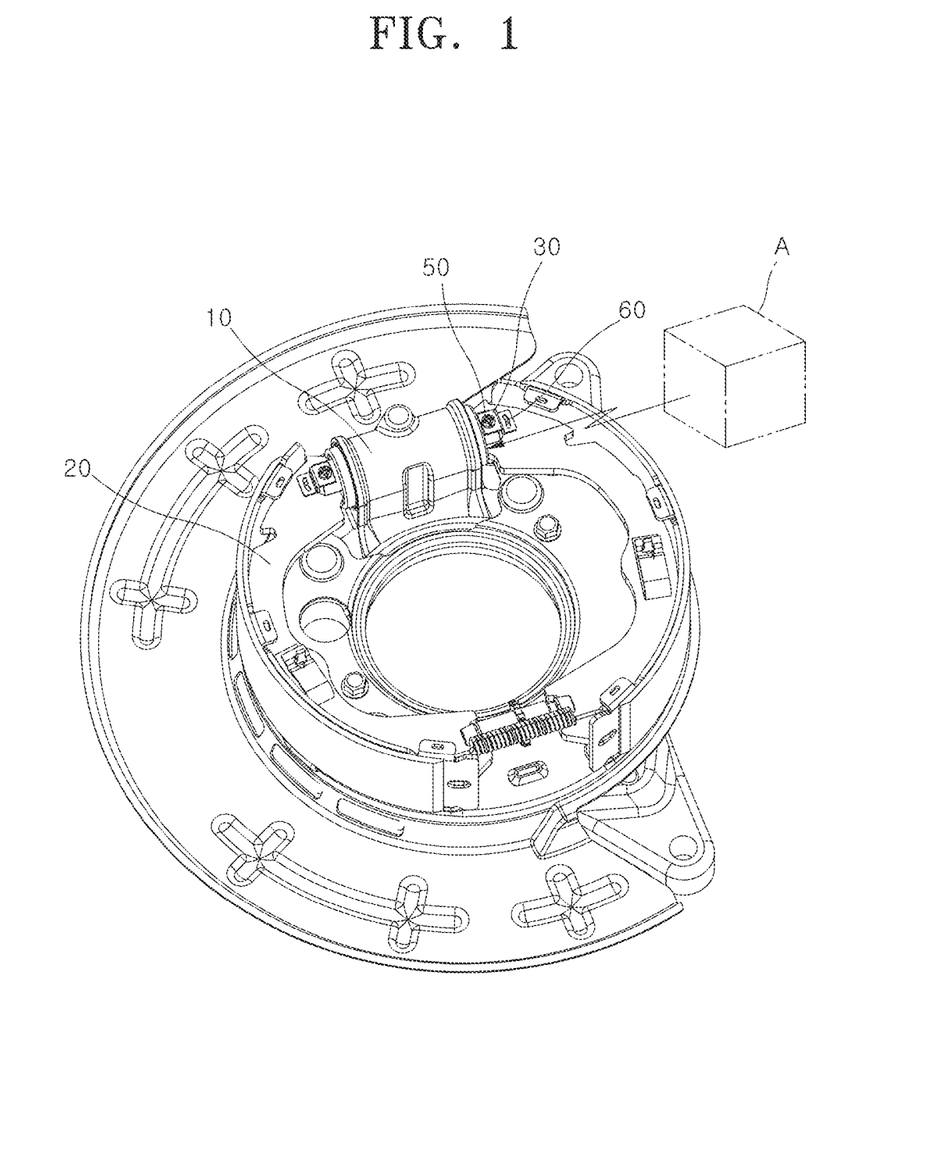
FIG. 1 is a perspective view schematically illustrating a drum brake apparatus for a vehicle in accordance with an embodiment of the present invention.
Figure 2:
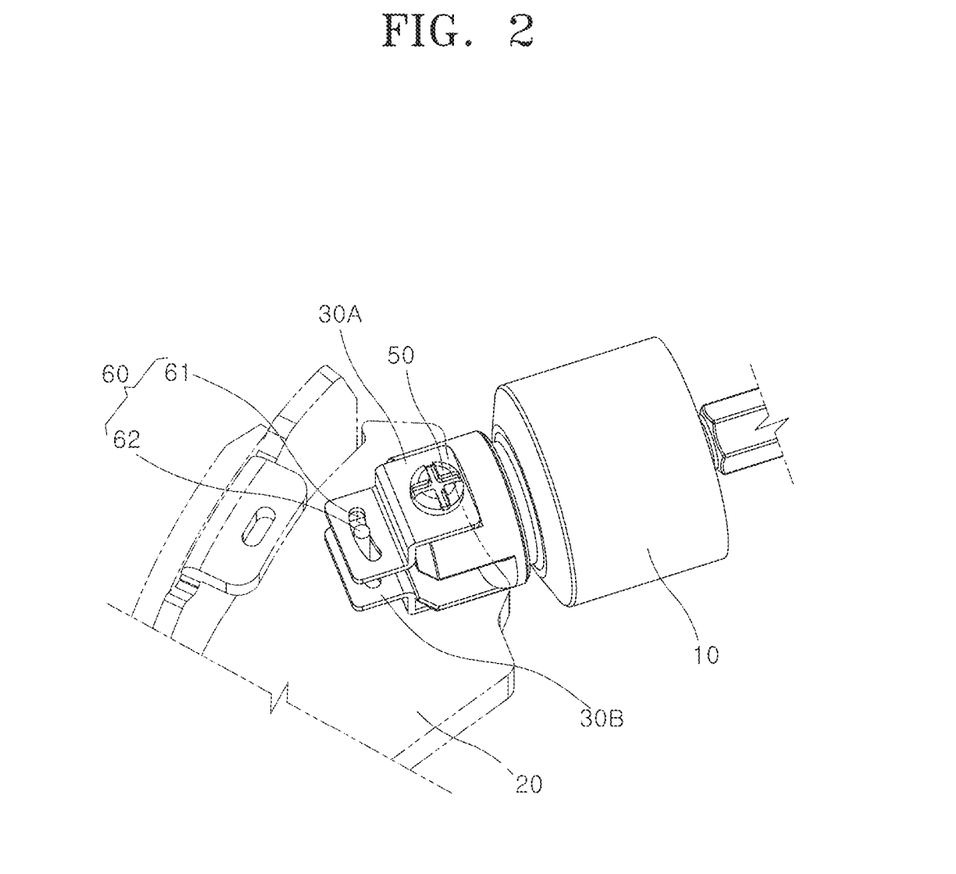
FIG. 2 is an expanded view of main parts of FIG. 1.

FIG. 1 is a perspective view schematically illustrating a drum brake apparatus for a vehicle in accordance with an embodiment of the present invention, and FIG. 2 is an expanded view of main parts of FIG. 1.

Referring to FIGS. 1 and 2, the drum brake apparatus for a vehicle in accordance with the embodiment of the present invention may include a cylinder device 10, a pair of shoes 20, a clip part 30, a cylinder coupling part 50 and a shoe assembling part 60.

The cylinder device 10 may be disposed between the pair of shoes 20, and push the pair of shoes 20 away from each other while the cylinder device 10 is expanded and contracted by an electromotive force, hydraulic pressure or the like. The pair of shoes 20 may frictionally contact a drum (not illustrated) while pushed away from each other by the cylinder device 10, and brake the vehicle (not illustrated) while constraining the rotation of a wheel (not illustrated) connected to the drum.

The clip part 30 may be extended from the cylinder device 10 toward the corresponding shoe 20, and elastically contact the shoe 20. The clip part 30 in accordance with the embodiment of the present invention may include a first clip 30A and a second clip 30B. The first clip 30A may be extended from the cylinder device 10 toward the shoe 20, and elastically contact one surface of the shoe 20. The second clip 30B may be disposed opposite to the first clip 30A, and elastically contact the other surface of the shoe 20.

The first and second clips 30A and 30B may have the shape of tongs, and elastically contact both surfaces of the shoe 20 disposed therebetween. The clip part 30 in accordance with the embodiment of the present invention may have a structure including the first and second clips 30A and 30B, but is not limited thereto. As the clip part 30 in accordance with the embodiment of the present invention, one corresponding to the first or second clip 30A or 30B may be applied.

The cylinder coupling part 50 may couple the first and second clips 30A and 30B to the cylinder device 10. One ends of the first and second clips 30A and 30B may be fixed to correct positions of the cylinder device 10 by the cylinder coupling part 50. The shoe assembling part 60 may fasten the first and second clips 30A and 30B to the shoe 20. The other ends of the first and second clips 30A and 30B may be connected to the shoe 20 by the shoe assembling part 60.

As described above, the pair of shoes 20 may be connected to the cylinder device 10 by the first clip 30A, the second clip 30B, the cylinder coupling part 50 and the shoe assembling part 60. Therefore, when the cylinder device 10 is expanded, the pair of shoes 20 may be pushed away from each other by the ends of the cylinder device 10. Furthermore, when the cylinder device 10 is contracted, the pair of shoes 20 may be pulled toward the cylinder device 10 so as to approach each other.

When an actuator A is driven in a forward direction, the cylinder device 10 may be expanded to press the pair of shoes 20 away from each other, thereby braking the vehicle (not illustrated). When the actuator A is driven in the reverse direction, the cylinder device 10 may be contracted and returned to the initial state. When the cylinder device 10 is returned, the braking of the vehicle may be released while the clip part 30 and the shoes 20 are towed and moved to the initial positions by the cylinder device 10, that is, while the pair of shoes 20 are moved toward each other by the cylinder device 10.

Figure 3:
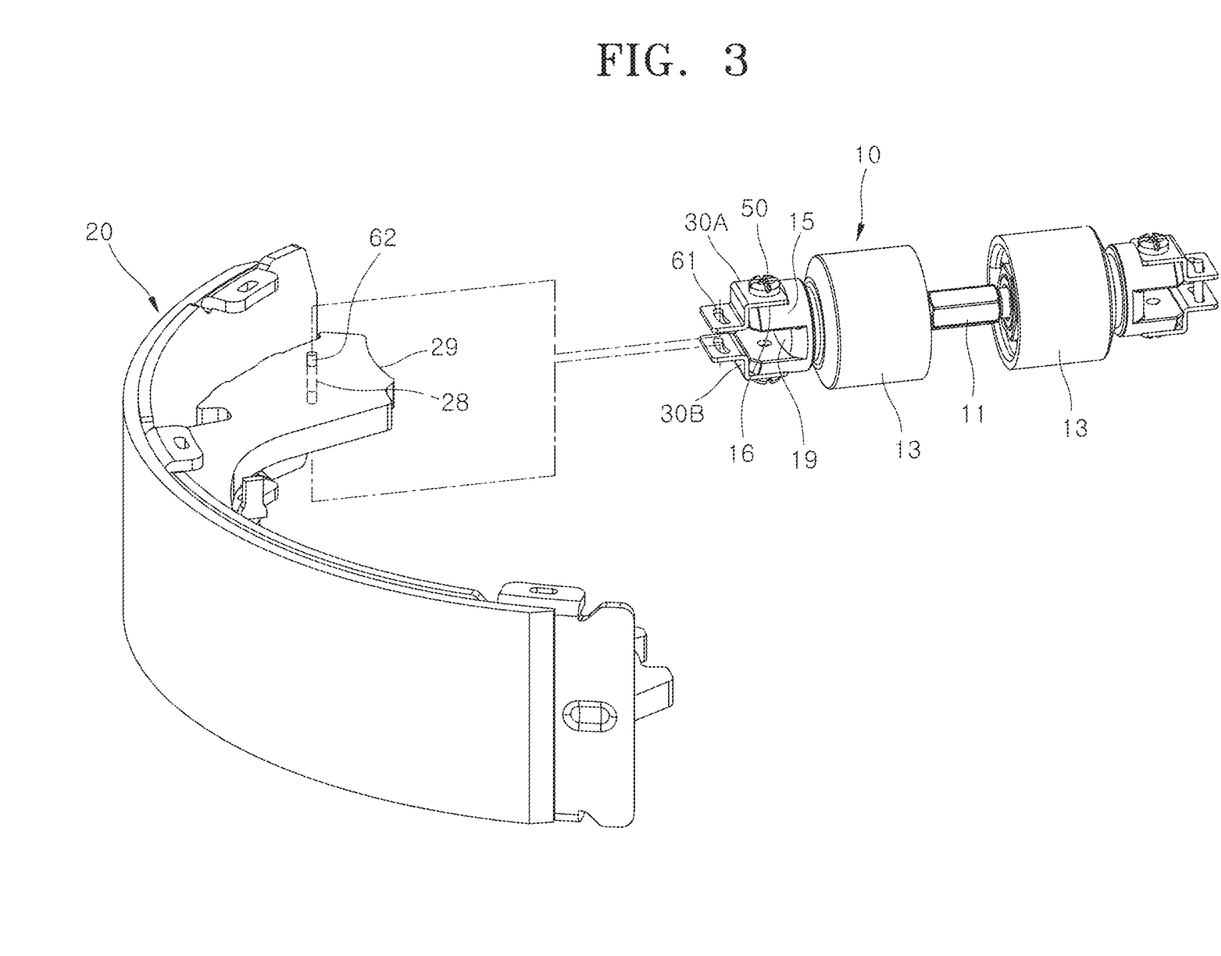
FIG. 3 is an exploded perspective view illustrating main parts of the drum brake apparatus for a vehicle in accordance with the embodiment of the present invention.
Figure 4:
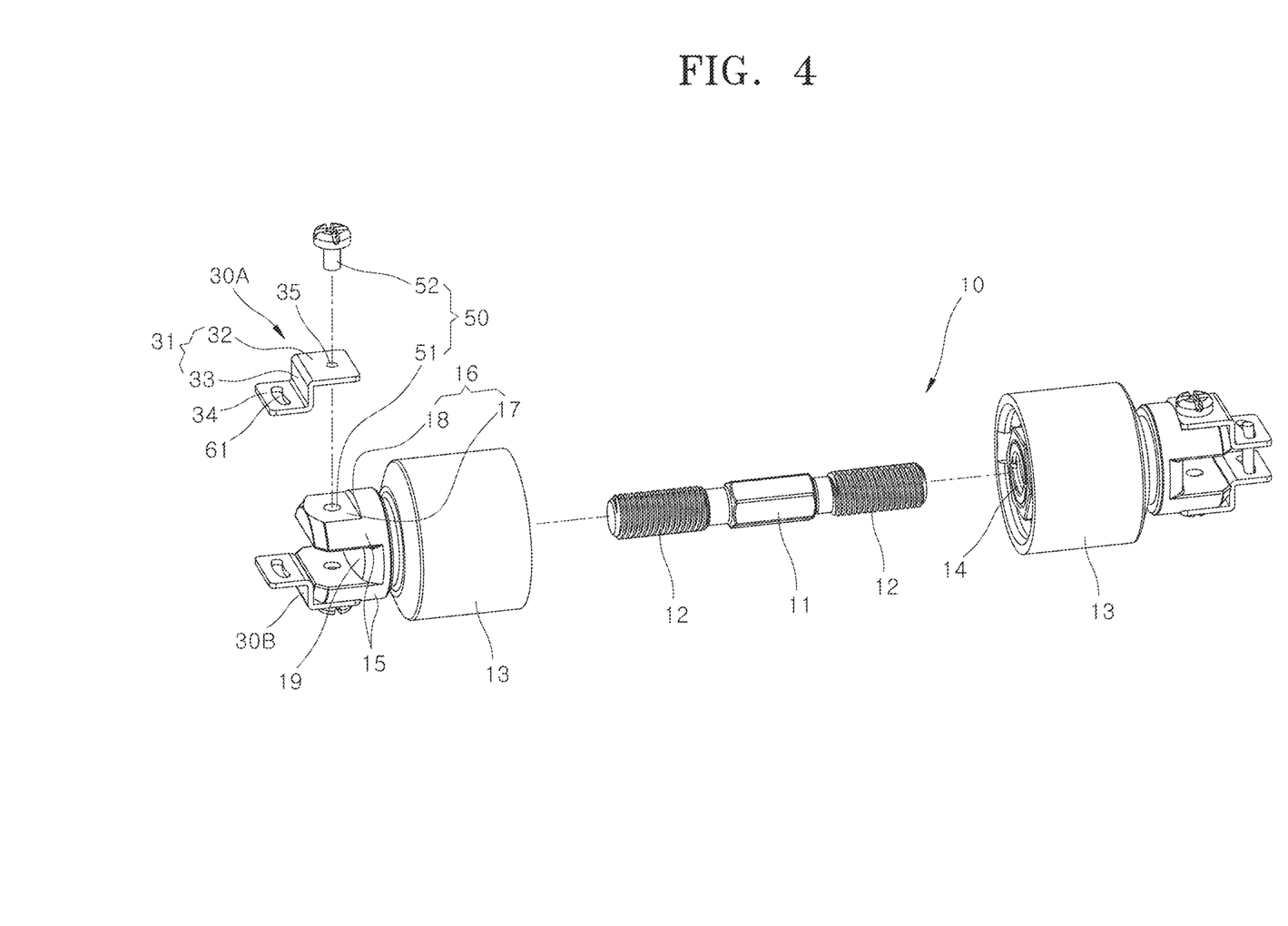
FIG. 4 is an exploded perspective view illustrating a coupling structure of a cylinder device, a first clip and a cylinder coupling part in the drum brake for a vehicle in accordance with the embodiment of the present invention.

FIG. 3 is an exploded perspective view illustrating the main parts of the drum brake apparatus for a vehicle in accordance with the embodiment of the present invention, and FIG. 4 is an exploded perspective view illustrating a coupling structure of the cylinder device, the first clip and the cylinder coupling part in the drum brake for a vehicle in accordance with the embodiment of the present invention.

Referring to FIGS. 3 and 4, the cylinder device 10 in accordance with the embodiment of the present invention may include a rotating rod 11, a piston part 13, a rotation constraint part 15, a clip coupling part 16, a clip seating part 17, an anti-movement protrusion 18 and a round guide part 19.

The rotating rod 11 may be installed in the cylinder device 10 so as to extend in the side-to-side direction, and rotated at a correct position while interlocking with operations of the actuator A and a gear device (not illustrated). The rotating rod 11 may have bolt screws 12 formed at both ends thereof. The piston part 13 may be coupled to both ends of the rotating rod 11 through nut screws 14 engaged with the bolt screws 12.

When the actuator A is driven in the forward direction with the rotating rod 11 and the piston part 13 coupled to each other through the bolt screws 12 and the nut screws 14, the rotating rod 11 may be rotated in the forward direction, the pair of left and right pistons 13 may be moved to the left and right along the rotating rod 11 so as to be away from each other, and the entire length of the cylinder device 10 may be increased. When the actuator A is driven in the reverse direction, the rotating rod 11 may be rotated in the reverse direction, the pair of left and right pistons 13 may be moved toward each other along the rotating rod 11, and the entire length of the cylinder device 10 may be decreased.

The rotation constraint part 15 may serve to constrain the rotation of the piston part 13 based on the shoe 20, such that the linear movement of the piston part 13 with respect to the rotation of the rotating rod 11 can be reliably performed in proportion to the rotational displacement of the rotating rod 11. The rotation constraint part 15 may be formed at an end of the piston part 13 so as to extend toward the shoe 20. The rotation constraint part 15 may include a pair of rotation constraint parts 15 which contact one surface and the other surface of the shoe 20, respectively, and are disposed with a predetermined distance provided therebetween, the predetermined distance corresponding to the thickness of the shoe 20. The shoe 20 may be inserted between the pair of rotation constraint parts 15, and the rotation constraint parts 15 and the piston part 13 may be locked to the shoe 20 such that the rotations thereof are constrained by a frictional force therebetween.

The clip coupling part 16, to which the first and second clips 30A and 30B are coupled, may be formed on the outer circumference of the rotation constraint part 15, which does not face the shoe 20. Referring to FIG. 4, the clip coupling part 16 in accordance with the embodiment of the present invention may include the clip seating part 17 and the anti-movement protrusion 18.

The clip seating part 17, on which the first and second clips 30A and 30B are seated while being in surface contact with the clip seating part 17, may be formed on the outer surface of the rotation constraint part 15, and extended to the end of the rotation constraint part 15. An end of the first clip 30A may be brought in surface contact with the clip seating part 17, and the cylinder coupling part 50 may be coupled to the clip seating part 17.

The anti-movement protrusion 18 for constraining movement and rotation of the first clip 30A may be formed to protrude at one end of the clip seating part 17 so as to abut an edge of the first clip 30A. When the clip seating part 17 is formed at the left end of the rotation constraint part 15 and the anti-movement protrusion 18 is formed at the right end of the the clip seating part 17, the right end of the first clip 30A seated on the clip seating part 17 may abut the anti-movement protrusion 18.

The first clip 30A may be easily seated on the correct position of the clip seating part 17 based on the anti-movement protrusion 18, when the drum brake apparatus in accordance with the embodiment of the present invention is assembled. With the first clip 30A fixed to the clip seating part 17 by the cylinder coupling part 50, the first clip 30A may be locked to the anti-movement protrusion 18 and constrained from rotating about the cylinder coupling part 50 or moving in an arbitrary direction.

When the vehicle (not illustrated) is parked on a slope way, the vehicle may slightly move in the case that a driver releases a main brake pedal (not illustrated) after operating a parking brake (not illustrated). At this time, while a disk (not illustrated) is rotated with a wheel (not illustrated), the shoe 20 brought in contact with the inside of the disk (not illustrated) may be moved together.

Figure 5:
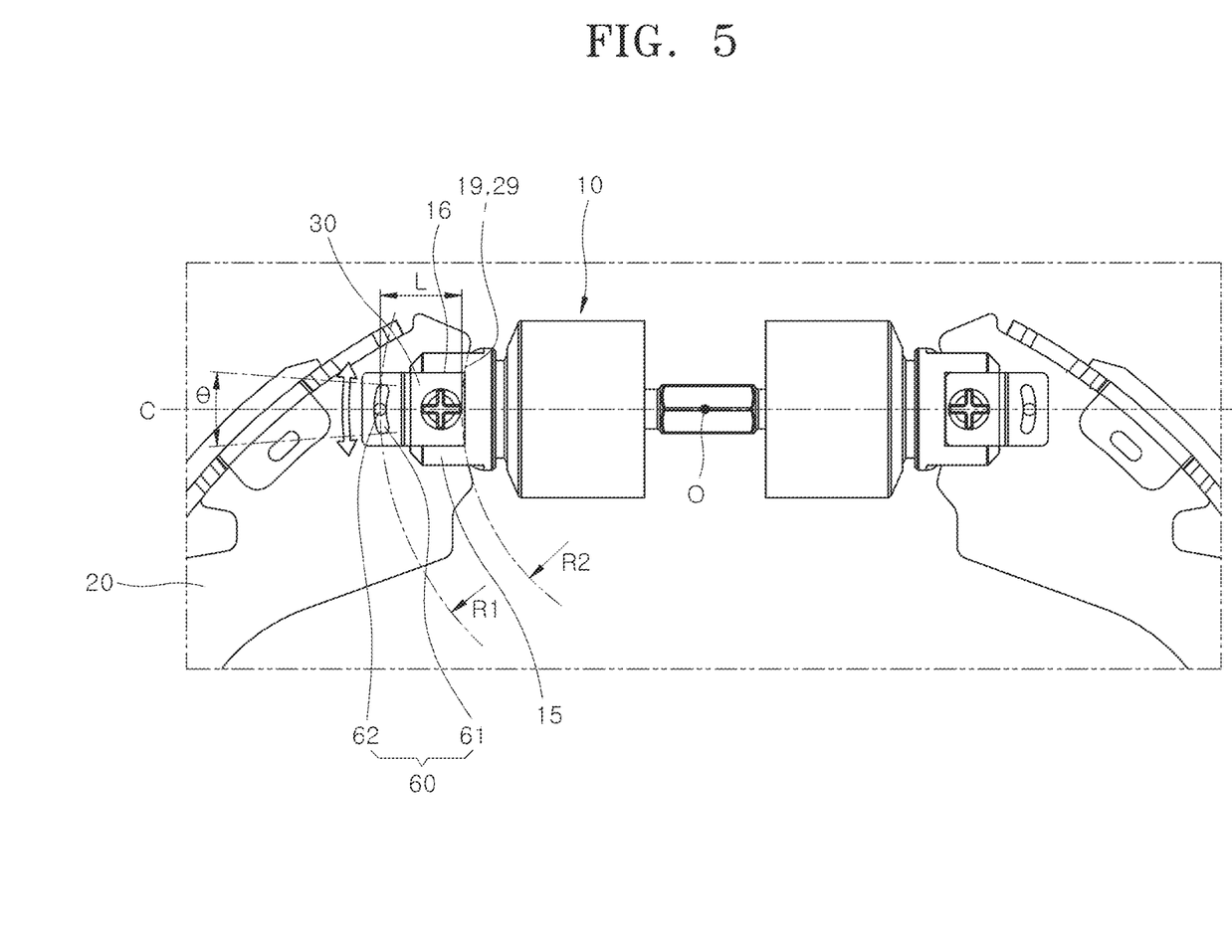
FIG. 5 is a conceptual diagram for describing the shape of an anti-interference part of the drum brake apparatus for a vehicle in accordance with the embodiment of the present invention.

The round guide part 19 may serve to guide the movement of the shoe 20 along a circular arc-shaped moving line (see an empty arrow of FIG. 5). The round guide part 19 may be formed in a rounded shape at an end of a space formed between the pair of rotation constraint parts 15. More specifically, the round guide part 19 may be formed at a portion of the space, facing the end of the shoe 20. The shoe 20 may have a round contact part 29 formed at an end of thereof, facing the round guide part 19, and the round contact part 29 may have a shape corresponding to the shape of the round guide part 19, that is, a concavely rounded shape.

When a driver operates the parking brake (not illustrated) to park the vehicle on a slope way, the cylinder device 10 may be expanded, and the round guide part 19 may push the shoe 20 while maintaining the contact with the round contact part 29 of the shoe 20. Thus, parking braking may be achieved by a frictional force with the disk (not illustrated). In such a state, when the driver releases the main brake pedal (not illustrated), the shoe 20 may be moved interlocking with rotation of the wheel (not illustrated) and the disk (not illustrated) at a predetermined angle. At this time, the movement of the shoe 20 may be performed while the round contact part 29 is slid along the round guide part 19.

Referring to FIG. 4, the first clip 30A in accordance with the embodiment of the present invention may include a piston coupling part 31 and a shoe spring part 34.

The piston coupling part 31 corresponding to a fixing end of the first clip 30A may be coupled and fixed to the cylinder device 10 by the cylinder coupling part 50. Referring to FIG. 4, the piston coupling part 31 in accordance with the embodiment of the present invention may include a piston fixing part 32 and an anti-movement bent part 33.

The piston fixing part 32 may contact the clip seating part 17, have a shape corresponding to the clip seating part 17, and extend in a direction parallel to the extension direction of the cylinder device 10. With the piston fixing part 32 seated on the clip seating part 17, the piston fixing part 32 may be fixed to the correct position of the rotation constraint part 15 by the cylinder coupling part 50, and locked to the anti-movement protrusion 18 so as not to move or rotate in an arbitrary direction.

The anti-movement bent part 33 may be brought in surface contact with the rotation constraint part 15 in a different direction from the piston fixing part 32, in order to prevent movement and rotation of the first clip 30A. The anti-movement bent part 33 may be formed at an end of the piston fixing part 32, facing the shoe 20, and extended toward the shoe 20 along the end of the rotation constraint part 15. More specifically, the piston fixing part 32 may be extended in the axial direction of the cylinder device 10, and the anti-movement bent part 33 may be extended in the thickness direction of the rotation constraint part 15, i.e. the radial direction of the cylinder device 10.

When the piston fixing part 32 of the first clip 30A is fixed on the clip seating part 17 by the cylinder coupling part 50, movement and rotation of the piston fixing part 32 may be restrained by multiple components. Specifically, the movement and rotation of the piston fixing part 32 may be restrained by not only the anti-movement protrusion 18 contacting one end of the piston fixing part 32, but also the anti-movement bent part 33 formed at the other end of the piston fixing part 32.

The shoe spring part 34 corresponding to a free end of the first clip 30A may be formed at an end of the anti-movement bent part 33, and extended toward the shoe 20. The shoe spring part 34 may be brought in elastic contact with the shoe 20, and fastened to the shoe 20 by the shoe assembling part 60. The piston coupling part 31 and the shoe spring part 34 may be formed as one body, and the first clip 30A having such a shape may be easily formed by bending a metallic plate material a plurality of times.

The second clip 30B may have a symmetrical structure with the first clip 30A with respect to the center axis C of the cylinder device 10. Since the second clip 30B has a symmetrical structure with the first clip 30A, the duplicated descriptions of the structure and operation thereof will be omitted herein.

Referring to FIG. 4, the cylinder coupling part 50 in accordance with the embodiment of the present invention may include a fastening hole 51 and a fastening member 52.

The fastening hole 51 may be formed in the rotation constraint part 15 of the cylinder device 10, or specifically the clip seating part 17. The piston fixing part 32 of the first clip 30A may have a through-hole 35 formed at a position corresponding to the fastening hole 51. The fastening member 52 may be fastened to the fastening hole 51 through the through-hole 35, in order to fix the first clip 30A to the cylinder device 10. As the fastening member 52, a bolt member may be applied.

Figure 6:
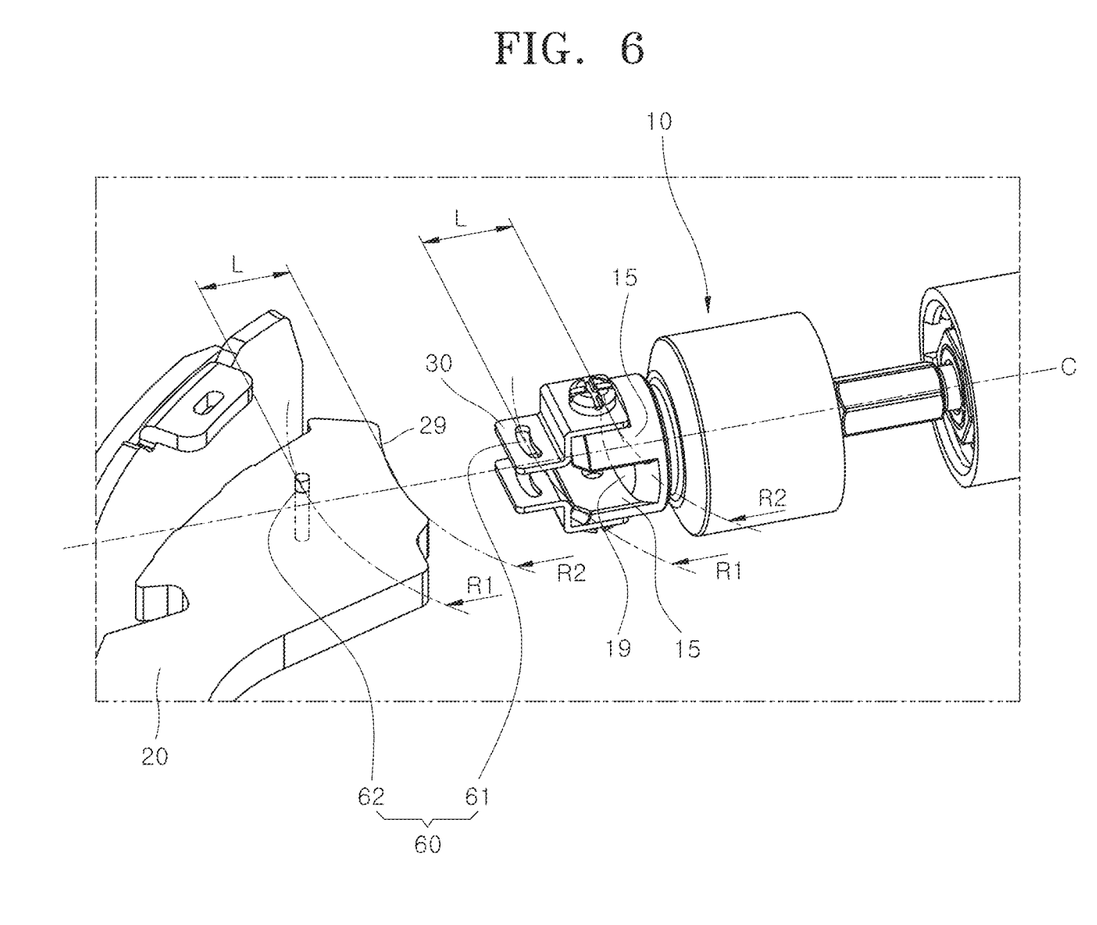
FIG. 6 is a conceptual diagram for describing the positions of the anti-interference part and a guide pin of the drum brake apparatus for a vehicle in accordance with the embodiment of the present invention.

FIG. 5 is a conceptual diagram for describing the shape of an anti-interference part of the drum brake apparatus for a vehicle in accordance with the embodiment of the present invention, and FIG. 6 is a conceptual diagram for describing the positions of the anti-interference part and a guide pin of the drum brake apparatus for a vehicle in accordance with the embodiment of the present invention.

Referring to FIGS. 5 and 6, the shoe assembling part 60 in accordance with the embodiment of the present invention may include an anti-interference part 61 and a guide pin 62.

The anti-interference part 61 may be formed in a long hole shape through the first clip 30A, in order not to disturb movement of the shoe 20 which occurs when the vehicle is parted on a slope way. More specifically, the anti-interference part 61 may be formed in a circular arc shape which has a first radius R1 corresponding to a distance between an origin O positioned on the center axis C of the cylinder device 10 and the guide pin 62. The center axis C may correspond to the rotation center axis of the rotating rod 11.

The round guide part 19 of the cylinder device 10 may be formed in a rounded shape having a second radius R2 based on the origin O. The round contact part 29 of the shoe 20 may be formed in a concavely rounded shape with the second radius R2, and disposed facing the round guide part 19. The position of the origin O may not be specifically limited, but changed to various suitable positions depending on the specifications of related parts, such as the radius of the wheel (not illustrated) and the length of the cylinder device 10.

The guide pin 62 may be coupled to the shoe 20 so as to protrude from the shoe 20, and inserted into the anti-interference part 61. The first clip 30A may maintain the contact between of the shoe spring part 34 and the shoe 20 by the elastic force of the shoe spring part 34, and the guide pin 62 may be passed through the anti-interference part 61 so as to stably maintain the fastening force for the shoe 20.

The distance between the round guide part 19 and the anti-interference part 61 may be set to a predetermined distance L (=R1−R2) corresponding to (first radius R1−second radius R2). The guide pin 62 may be disposed on the center axis C of the cylinder device 10, and disposed at a position spaced by the predetermined distance L apart from the round contact part 29, corresponding to distance L between the round guide part 19 and the anti-interference part 61.

The shoe 20 may have a hole 28 formed at a position corresponding to the above-described position, and the guide pin 62 having a larger length than the thickness of the shoe 20 may be forced into the hole 28 and fixed to the position of the shoe 20 so as to protrude in both directions. The guide pin 62 may have a serration shape or a pin diameter stepped shape which considers that the guide pin 62 is forced into the shoe 20.

The guide pin 62 may have a protrusion height enough to move into or out of the anti-interference part 61 when the shoe spring part 34 of the first clip 30A is elastically deformed to be separated from the shoe 20. Therefore, when the shoe 20 needs to be replaced due to abrasion of a friction material, the guide pin 62 may be easily separated from the anti-interference part 61 only through a simple process of pushing back the elastic shoe spring part 34 of the first clip 30A away from the shoe 20, without an inconvenient process of releasing the bolt member.

The anti-interference part 61 and the round guide part 19 and the round contact part 29 may be disposed on the center axis C of the cylinder device 10, and extended along the circular arcs having the first and second radiuses R1 and R2, respectively, based on the origin O. Thus, when the vehicle is parked on a slope way, the shoe 20 may be smoothly moved along the round guide part 19 around the origin O without interfering with the first and second clips 30A and 30B, even with the shoe 20 fastened to the first and second clips 30A and 30B by the guide pin 62.

The extension length and extension angle θ of the anti-interference part 61 may have a length equal to or larger than the moving distance of the shoe 20 in consideration of the movement of the shoe 20, in order not to disturb the movement of the shoe 20. As the anti-interference part 61 is formed, the moving force of the shoe 20 may be prevented from being concentrated on the guide pin 62 and the clip part 30.

When the anti-interference part 61 has the first radius R1 centered at the origin O, it may indicate that the upper and lower portions of the anti-interference part 61 are bent toward the cylinder device 10 based on the center axis C or gradually close to the cylinder device 10 as the upper and lower portions are away from the center axis C. The guide pin 62 may be disposed on a position of the anti-interference part 61 on the center axis C, which correspond to the furthest position from the cylinder device 10.

Thus, during the return operation in which the length of the cylinder device 10 is decreased, the guide pin 62 may not be moved in a direction away from the center axis C or specifically in the top-to-bottom direction on FIG. 5, but linearly moved by the same displacement as the linear movements of the piston part 13 and the first clip 30A along the anti-interference part 61, i.e. the center axis C. Through such an operation, the shoe 20 may be reliably returned to the initial position while interworking with the return operation of the cylinder device 10.

In the drum brake for a vehicle in accordance with the embodiment of the present invention, the cylinder device 10 and the shoe 20 may be connected through the first and second clips 30A and 30B. Thus, the shoe 20 may be moved in connection with the expansion of the cylinder device 10, and returned to the initial position in connection with the return of the cylinder device 10.

Therefore, it is possible to omit not only a return spring (not illustrated) which has been installed to return the shoe 20 to the initial position in the related art, but also a inconvenient process of disposing a return spring in consideration of interference with neighboring parts and fastening both ends of the return spring to the pair of shoes 20. Thus, the simplification of the assembly process can improve the assembling property.

Furthermore, a return spring (not illustrated) can be omitted from the limited space formed between the pair of shoes 20, which makes it possible to significantly improve the degree of freedom in design of the vehicle. Therefore, vehicle parts such as a tone wheel, which could not be applied in order to avoid interference with a return spring (not illustrated), can be applied and upgraded, thereby expanding the performance of the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A drum brake apparatus for a vehicle, comprising:
a cylinder device configured to apply a braking force to a shoe;
a clip part extending from the cylinder device toward the shoe and elastically contacting the shoe;
a cylinder coupling part configured to couple the clip part to the cylinder device; and
a shoe assembling part configured to fasten the clip part to the shoe and comprising:
an anti-interference part comprising the clip part having an elongated hole; and
a guide pin coupled to and protruding from the shoe and configured to fit into the elongated hole,
wherein the elongated hole has a circular arc shape having a first radius corresponding to a distance between the guide pin and a center of a circle having the first radius, the center of the circle being positioned on a center axis of the cylinder device,
the cylinder device comprises a convex guide surface facing the shoe and having a second radius with respect to the center of the circle, the second radius being smaller than the first radius, and
the shoe comprises a concave contact surface in contact with the convex guide surface of the cylinder device, having the second radius and configured to slide along the convex guide surface of the cylinder device when the shoe is moved.

2. The drum brake apparatus of claim 1, wherein when an actuator is driven in a forward direction, the cylinder device presses the shoe to brake a vehicle while the length of the cylinder device is increased, and
when the actuator is driven in a reverse direction, the clip part and the shoe are moved to initial positions in connection with a returning operation of the cylinder device, such that the braking of the vehicle is released.

3. The drum brake apparatus of claim 1, wherein the cylinder device comprises:
a rotating rod installed so as to rotate at a correct position and having bolt screws formed at both ends thereof;
a piston part having nut screws engaged with the bolt screws so as to be coupled to both ends of the rotating rod, and moved in an extension direction of the rotating rod when the rotating rod is rotated;
a rotation constraint part formed at an end of the piston part so as to extend toward the shoe, and constraining rotation of the piston part using a contact force with the shoe; and
a clip coupling part formed on the rotation constraint part, such that the clip part is coupled to the clip coupling part.

4. The drum brake apparatus of claim 3, wherein the clip coupling part comprises:
a clip seating part formed evenly on the rotation constraint part, wherein the clip part is brought in surface contact with the clip seating part and the cylinder coupling part is coupled to the clip seating part; and
an anti-movement protrusion formed at one side of the clip seating part, and contacting the clip part so as to restrain movement of the clip part.

5. The drum brake apparatus of claim 1, wherein the clip part comprises:
a first clip contacting a first side of the shoe; and
a second clip elastically contacting a second side of the shoe opposite to the first side.

6. The drum brake apparatus of claim 5, wherein the first clip comprises:
a piston coupling part coupled to the cylinder device by the cylinder coupling part; and
a shoe spring part connected to the piston coupling part, and elastically contacting the shoe.

7. The drum brake apparatus of claim 6, wherein the piston coupling part comprises:
a piston fixing part extended in a direction parallel to the extension direction of the cylinder device, brought in surface contact with the cylinder device, and fixed to the cylinder device by the cylinder coupling part; and
an anti-movement bent part formed continuously with the piston fixing part, extended in a different direction from the piston fixing part along an end of the cylinder device, and constrained from moving by a contact force with the cylinder device.

8. The drum brake apparatus of claim 1, wherein the cylinder coupling part comprises:
a fastening hole formed at an end of the cylinder device; and
a fastening member fastened to the fastening hole through the clip part.

9. The drum brake apparatus of claim 1, wherein the guide pin has a protrusion height enough to move into or out of the anti-interference part when an end of the clip part is elastically deformed away from the shoe.

* * * * *